United States Patent [19]

Smalheiser

[11] 3,933,980

[45] Jan. 20, 1976

[54] PROCESS FOR REMOVING ETHYLENICALLY UNSATURATED CHLORINATED HYDROCARBONS FROM GAS STREAMS

[75] Inventor: Lawrence A. Smalheiser, Spring Valley, N.Y.

[73] Assignee: Stauffer Chemical Company, Westport, Conn.

[22] Filed: Dec. 19, 1974

[21] Appl. No.: 534,522

[52] U.S. Cl. ............... 423/245; 423/481; 423/488
[51] Int. Cl.² ........................................ B01D 53/34
[58] Field of Search ........... 423/210, 224, 481, 488, 423/240, 241, 245, 581; 21/53, 55, 57, 58

[56] References Cited
UNITED STATES PATENTS

| 1,961,878 | 6/1934 | Gilkey | 423/210 |
| 2,975,035 | 3/1961 | Cook | 423/581 X |
| 3,151,943 | 10/1964 | Fujimoto et al. | 423/245 X |
| 3,445,192 | 5/1969 | Woodland et al. | 423/481 X |
| 3,829,558 | 8/1974 | Banks et al. | 423/481 |

Primary Examiner—Earl C. Thomas

[57] ABSTRACT

The invention is a method for reducing the amount of ethylenically unsaturated chlorinated hydrocarbons in gaseous mixtures. The method comprises providing a gas stream containing the ethylenically unsaturated chlorinated hydrocarbon and ozone by admixing ozone with a gas stream containing ethylenically unsaturated chlorinated hydrocarbons or introducing the ethylenically unsaturated chlorinated hydrocarbons into a gas stream containing ozone, and permitting the gas containing the ethylenically unsaturated chlorinated hydrocarbons and ozone to react for a sufficient length of time to reduce the amount of ethylenically unsaturated chlorinated hydrocarbon in the gas stream. The method is particularly useful for removing small amounts of vinyl chloride from gaseous streams thereby substantially reducing or eliminating the emission of such contaminants into the environment.

12 Claims, No Drawings

3,933,980

PROCESS FOR REMOVING ETHYLENICALLY UNSATURATED CHLORINATED HYDROCARBONS FROM GAS STREAMS

BACKGROUND OF THE INVENTION

Ethylenically unsaturated chlorinated hydrocarbons (hereinafter noted as EUCH) find many uses in commercial processes. Chlorinated ethylenes such as vinyl chloride, vinylidene chloride, trichloroethylene and perchloroethylene have diverse uses in industry. During preparation and use of the EUCH, gas streams containing small amounts of these materials are produced and usually vented to the atmosphere. The EUCH can contribute to the production of smog in the atmosphere and certain compounds are believed to be deleterious to the environment.

Gaseous emissions containing EUCH can arise in processes for the preparation of 1,2-dichloroethane, in processes in which chloroethyl phosphate or phosphonate compositions are dehydrohalogenated or condensed, in processes for preparation of vinyl chloride monomer, in processes in which vinyl chloride is polymerized to polyvinyl chloride, in processes for drying vinyl chloride containing polymers, during fabrication of articles from polyvinyl chloride, in copolymerization processes in which vinyl chloride or vinylidene chloride are monomers or comonomers in polymerization with non-chlorine containing monomers, and in vapor phase degreasing processes in which trichloroethylene or perchloroethylene are used as the solvents.

The vents from the reactors and ventilation air from the area around the reactors, mills and degreasers usually contain small amounts of the EUCH. Since these chlorinated materials are present in the gas stream in small concentrations, they are usually difficult to economically recover or remove from the gas stream.

It has been proposed to remove the chlorinated materials from gas streams by incinerating the gas streams to convert the chlorinated materials to hydrogen chloride, water and carbon dioxide. However, when the chlorinated materials are present in the gas stream in only small amounts, or contain a relatively large proportion of chlorine, the energy required to heat the gas stream to a temperature sufficiently high to destroy the compounds is large. The large energy requirement makes the process unattractive for application in many commercial applications.

It has also been proposed to adsorb chlorinated hydrocarbons from gas streams on activated carbon. This method is difficult to operate where large volumes of gas containing only small amounts of chlorinated hydrocarbons must be processed. The method requires that energy be provided to pump the gas stream through the relatively large pressure drop across a bed of activated carbon. In addition, the activated carbon must be regenerated if the method is to remain effective.

A solution to this problem has been sought for some time. Ideally such a solution would substantially reduce the amount of EUCH in a gas stream in a manner which is simple, can be operated inexpensively and safely and provide for a substantial reduction in the amount of EUCH in the gaseous stream.

It is an object of the present invention to provide a method for reducing the amounts of EUCH in gas streams. It is an object of the present invention to provide a simple, relatively inexpensive method for reducing the amount of vinyl chloride, dichloroethylene, trichloroethylene and perchloroethylene in gas streams. It is a further object of the present invention to provide a method for substantially reducing the amounts of vinyl chloride and vinylidene chloride in gas streams which arise from the production of these EUCH, the polymerization of these materials to polymers and the fabrication of the polymers into utilitarian articles.

BRIEF DESCRIPTION OF THE INVENTION

According to the present invention, the amount of EUCH in gaseous streams can be reduced by contacting said chlorinated hydrocarbons with ozone. This can be readily accomplished by mixing ozone with the contaminant containing gas stream in a reaction zone and maintaining contact between the ozone and the EUCH in the reaction zone for a sufficient length of time to reduce the amount of EUCH in the gaseous stream.

The method is particularly useful for reducing the amount of chlorinated ethylenes and particularly vinyl chloride monomer in gas streams. The method can also reduce the amounts of other EUCH in gas streams. The process can be carried out at ambient temperatures, however, reaction times are substantially reduced at elevated temperatures.

Subsequent contact of the reacted gas stream with water or an aqueous solution which can be alkaline or acid will substantially reduce the amount of products of reaction in the gas stream.

DETAILED DESCRIPTION OF THE INVENTION

It has been shown that certain ethylenically unsaturated materials will react with ozone. However, investigations are usually carried out in the liquid phase at relatively low temperatures. The reaction of halogenated olefins with ozone in the liquid phase has been reported in the *Journal of the American Chemical Society*, (1968) Vol. 90, pages 4248–52 and *Ozone Reactions with Organic Compounds, Advances in Chemical Series* 112, pages 50–64 American Chemical Society, 1972.

It has been discovered that EUCH react with ozone in the gaseous phase. The reaction is rapid at elevated temperatures. It has been discovered that the reaction of EUCH with ozone in the gaseous phase can be utilized in a process which rapidly removes EUCH from gaseous streams. The process is simple, requires a minimum of processing equipment and can substantially reduce the amount of EUCH in gaseous streams. The process is particularly useful for reducing the amount of EUCH in gaseous emissions from processes which produce or handle vinyl chloride monomer as a product or byproduct.

In general, the process comprises confining a gas mixture containing EUCH, admixing ozone with the gas mixture, permitting the mixture to react for a sufficient length of time to reduce the amount of EUCH in the gas mixture by chemical reaction.

The process can be used to treat gas streams which arise in ethylene oxychlorination processes, ethylene dichloride cracking operations, vinyl chloride polymerization processes in which vinyl chloride is a monomer or comonomer, ventilation streams from areas in which vinyl chloride monomer is or may be present, processes for preparing vinylidene chloride, polymerization processes in which vinylidene chloride is utilized as a monomer or comonomer, vapor degreasing operations, beta-chloroethyl phosphate condensation or dehydrohalogenation process and other processes or methods in which gas streams containing EUCH may arise.

The gas stream is confined in a reaction zone which can be a conduit, as for example, a pipe through which the gas stream is flowing or a reaction vessel or chamber which provides a sufficient amount of hold time for the admixed ozone to contact and react with the EUCH.

After reaction with ozone, the gas stream contains hydrogen chloride, oxygenated compounds such as carbon dioxide and water, and can contain phosgene and partially oxygenated hydrocarbons such as methanol and the like. If the gas stream contained only small amounts of EUCH, the amount of hydrogen chloride in the gas stream will be small, and the gas stream can be vented directly to the atmosphere without further treatment. If the gas stream contains relatively large amounts of EUCH, the gas stream after reaction with the ozone can contain relatively large quantities of the reaction products, hydrogen chloride and oxygenated compounds such as methanol and the like. The reaction products can be easily separated from ozone reacted gas stream by contacting the gas stream with water or an aqueous solution.

Contacting the gas stream with an aqueous medium is advantageous in that products of the reaction are removed from the gas stream and partially oxidized hydrocarbons can further react with any unreacted ozone present in the gas stream. The aqueous medium also aids in hydrolysis of reaction products of ozone and EUCH.

The gas stream can be contacted with an aqueous medium by any methods known in the art such as in packed towers, spray chambers, venturi scrubbers, falling film absorbers or other methods useful for contacting gases with liquids.

Water can be used as the aqueous medium or acid or alkaline solutions can be effectively used. Alkaline solutions or mixtures containing alkaline compositions can be used to neutralize hydrogen chloride formed in the gas stream, and can also absorb and hydrolyze any phosgene formed in the process. Alkaline compositions such as alkali metal hydroxides, carbonates and alkaline earth metal hydroxides and carbonates or mixtures of alkali metal and alkaline earth metal hydroxides and carbonates are useful.

The gas stream to be treated can contain in addition to the EUCH usual components of such gas streams as nitrogen, oxygen, water vapor, carbon monoxide, carbon dioxide and the like. The gas stream can contain organic materials other than EUCH which may or may not react with the ozone. The amount of certain ethylencially unsaturated aliphatic, cyclic and aromatic hydrocarbons if present in the gas stream can be reduced since they are known to react with ozone. The ozone reactant should be provided in a sufficient amount to react with such hydrocarbons and thereby reduce the amount in the gas stream. The EUCH tend to react at a slower rate than ethylenically unsaturated compounds not containing halogen.

In addition to reducing the amount of EUCH in gas streams, the process is also suitable for treating gas streams containing ethylene, ethylenically unsaturated brominated hydrocarbons and ethylene unsaturated compounds containing iodine. However, the process of the present invention is particularly useful for treating gas emissions which arise from the production of vinyl chloride monomer, its polymerization and fabrication.

The process of this invention exhibits little effect on saturated aliphatic chlorinated compounds at low temperatures. Reaction with ozone occurs, to a limited degree, especially at elevated temperatures. In general, at low temperatures, major portions of any saturated aliphatic or saturated chlorinated aliphatic hydrocarbons will pass through the process without reaction with the ozone.

The rate of reaction between the EUCH and the ozone can be very rapid. At elevated temperatures in the range of 50°–250°C., the amount of EUCH in the gas stream can be substantially reduced in less than a second. Long reaction times are not harmful to the process and tend to increase the removal of EUCH from the gas stream. Generally, reaction times from about 0.25 to about 600 seconds are useful and reaction times from about 0.25 to about 60 seconds are preferred since smaller reaction zones can be employed.

Temperature has a direct effect on the rate of reaction. The rate of reaction between the EUCH and ozone becomes more rapid as the temperature is increased. Temperatures from about −40° to 400°C. are effective. Temperatures in the range of about 0° to 250°C. are preferred. The most preferred temperature range is from about 10° to 200°C. The concentration of EUCH and ozone affect the rate at which the amount of EUCH in the gas stream is reduced. High concentrations of ozone and low concentrations of EUCH produce rapid reduction in the amount of EUCH in the gas stream. High concentrations of EUCH and low concentrations of ozone tend to result in slower reaction of the EUCH in the gas stream.

The amount of ozone required to be admixed with the gas stream containing the ethylenically unsaturated halogenated hydrocarbons is dependent upon the compositions of the gas stream, the amount of oxygen present in the gas stream and the temperature of the gas stream. In general, it requires less than one mole of ozone to remove one mole of ethylenically unsaturated double bond from the gas stream. The amount of ozone required is dependent upon the temperature of the reactants, the amount of oxygen present in the gas stream and the particular EUCH and other components in the gas stream. Excess ozone is not deleterious to the process but increases the cost for removing EUCH from the gas stream.

It is well within the skill of one in the art to determine the optimum amounts of ozone to be mixed with the gas stream at a given temperature to obtain the reduction in the amount of EUCH required.

The term ethylenically unsaturated chlorinated hydrocarbon (EUCH) is used herein to refer to halogenated compositions containing an ethylenic double bond. The term is intended to encompass alkyl compounds having halogen substituents, vinyl compounds such as vinyl chloride, vinylidene chloride, vinyl bromide and the like, and other ethylenically unsaturated halogenated materials having two or more carbon atoms in the chain which one may desire to remove from a gas stream.

The rate of reaction of the ozone with the ethylenically unsaturated halogenated hydrocarbons depends upon the character of the halogen, its relation to the double bond and certain steric effects which may result from the large halogen atoms in the molecule. Nonhalogenated ethylenically unsaturated hydrocarbons such as ethylene or propylene react with ozone faster than halogenated derivatives Halogenated hydrocarbons such as 3-chloropropylene which have a halogen on a carbon away from the double bond react with ozone faster than compounds such as vinyl chloride which contains a halogen on a carbon with a double bond. Vinyl bromide reacts with ozone faster than the vinyl chloride. Vinyl chloride reacts with ozone faster than dichloroethylene. Dichloroethylene reacts with ozone faster than trichloroethylene. Of the chlorinated ethylenes, perchloroethylene reacts with ozone slowest.

The effect of the lower reaction rates of EUCH can be overcome to some extent by carrying out the reaction at an elevated temperature. As the temperature increases, the rate of reaction of ozone with EUCH increases. At elevated temperatures the amount of ozone required to remove a mole of ethylenically unsaturated double bond is lower.

Pressure is not critical to the process. The process can be carried out at from subatmospheric to superatmospheric pressure. Superatmospheric pressures can be convenient within a particular system despite added cost of pressure equipment. The size of the reaction zone can be substantially reduced or longer residence times can be provided by the same volume at the elevated pressures.

The process can be readily operated by merely admixing ozone with the gas stream containing EUCH or by admixing the gas stream containing the EUCH with a gas stream containing ozone. If the gas stream contains oxygen it is also possible to generate the ozone in situ in the gas stream by means of high intensity radiation at wave lengths shorter than about 2100 angstroms. It is preferred, however, to generate a gas stream containing oxone by conventional means known in the art. Such means include corona or silent electric discharge. The gas stream containing ozone is then admixed with the gas stream containing the EUCH.

Methods for generating ozone are well known in the art and will not be discussed in great detail here. Ozone can be generated by passing a dry air or oxygen stream through a silent electric or corona discharge. The ozone stream produced usually contains from about ½ to about 6% ozone. The gas stream containing ozone can be admixed directly with the gas stream which contains EUCH. It is at times advantageous to provide an ozone stream containing higher concentrations of ozone. Gas streams containing higher concentrations of ozone can be prepared by recirculation of oxygen through a silent or corona discharge with separation of the ozone from the ozonated stream. Ozone producing processes increase the amount of ozone produced per unit of power when oxygen is utilized in the process. Processes for preparing ozone are described in *Ozone Chemistry and Technology Advances in Chemistry*, Series 21, American Chemical Society, March, 1959 and Kirk-Othmer *Encyclopedia of Chemical Technology*, Second Edition, Interscience Publishers, 1967, Volume 14, pages 421–431.

The amount of ethylenically unsaturated halogenated hydrocarbons in the gas stream is usually less than about 10,000 parts per million. Therefore, relatively small amounts of ozone need be admixed with the gas stream containing the EUCH.

Operation of the process of the present invention is simple. It requires that the gas to be treated be confined to a reaction zone. The reaction zone can be pipes, ducts, chambers or vessels through which the gas stream containing the EUCH is flowing. A mixture of the gas stream with ozone is formed and the ozone is permitted to react with the EUCH for a sufficient length of time to reduce the amount of the EUCH in a gas stream to the required degree. As pointed out above, the reaction times can be as short as a fraction of a second when reactive EUCH are reacted in a gas stream particularly at an elevated temperature. Long reaction times are not harmful to the process and can result in substantial reaction of the ozone in the gas stream.

The gas stream containing the products of the reaction can be vented to the atmosphere if the concentration of the EUCH was small initially. If desired, the gas stream can be subsequently contacted with an aqueous medium to remove the products of the reaction from the gas stream before the gas stream is vented to the atmosphere. Products of the reaction are materials such as water, carbon dioxide, hydrogen chloride, partially oxidized organic moieties such as ethanol, methanol, acetic acid and the like. The products of the reaction are dependent upon the particular EUCH which have reacted in the gas stream, the temperature and the reaction time.

As used herein parts per million is by volume unless otherwise noted.

The process will be illustrated by reference to the following examples.

EXAMPLE 1

The rate of reaction of vinyl chloride in a gas mixture containing nitrogen, oxygen, ozone and vinyl chloride was determined. An air stream containing about 1% ozone was generated by passing air through a Welsbach Style T-816 ozone generator. The air stream containing ozone was metered by a rotometer and passed to a glass tee through TYGON$^{tm}$ tubing. At the glass tee, vinyl chloride vapor was introduced into the ozone containing gas stream. The gas mixture containing oxygen, nitrogen, ozone and vinyl chloride was passed through TYGON$^{tm}$ tubing to a one inch inside diameter by 14 inch long jacketed glass tube. The glass tube was empty. Means were provided to heat the tube by condensing steam at atmospheric pressure in the jacket.

The gas stream was sampled at the outlet of the glass tube by filling a syringe with the reaction mixture. The sample of reaction mixture was held in the syringe for the time period required then injected into an F. and M. Scientific Model 5750 gas chromatograph with a flame ionzation detector. The gas chromatograph utilized a ⅛ inch by 10 foot column packed with 10% by weight OV101$^{tm}$ on 80/100 mesh Supelcoport in series with a ⅛ inch by 10 foot column packed with 10% by weight OV17$^{tm}$ on 80/100 mesh Supelcoport.

The results of several runs are shown in Table I.

TABLE I

| RUN | A | B | C | D | E | F |
|---|---|---|---|---|---|---|
| Air flow to ozonizer* liter/minute | 5.0 | 5.0 | 5.0 | 5.0 | 5.0 | 1.0 |
| Mole ozone/mole VCM | 110 | 35 | 8.3 | 4.6 | 4.6 | 0.9 |
| Temperature °C. | 24 | 24 | 24 | 24 | ** | 24 |
| Time Sample Held in Syringe (minutes) | Vinyl Chloride Concentration (parts per million by volume) | | | | | |
| (Control) 0 | 88 | 280 | 1200 | 2200 | 2200 | 11,000 |

TABLE I-continued

| RUN | A | B | C | D | E | F |
|---|---|---|---|---|---|---|
| 0.1*** | ND | 35 | 88 | 290 | 64 | 1,100 |
| 0.2 | — | 4 | 22 | 160 | 11 | 590 |
| 0.3 | — | 1 | — | — | 6 | — |
| 0.4 | — | ND | 13 | 98 | 4 | 230 |
| 0.6 | — | — | — | — | 2 | — |
| 1.00 | — | — | ND | 34 | — | 89 |
| 2.00 | — | — | — | 2 | — | 17 |
| 3.00 | — | — | — | ND | — | — |
| 4.00 | — | — | — | — | — | 3 |

ND = Not detectable, less than 1 part per million.
* Ozonator rated at a nominal 1 percent ozone.
** Glass tube heated externally by condensing steam at atmospheric pressure.
***Time indication is approximate. Actual measured time varied from 0.07 to 0.12 minutes. The measured time does not include residence time in the glass tube.

In Run F, the interior of the glass tube became coated with condensed water shortly after introduction of the vinyl chloride into the gas stream containing ozone.

The method of Example 1 can be carried out by introducing the ozone or gas stream containing ozone into a gas stream containing the ethylenically unsaturated chlorinated hydrocarbon with a similar reduction in the amount of ethylenically unsaturated chlorinated hydrocarbon in the gas stream.

A comparison of Run E with Run D indicates that an increase in temperature for a short time substantially increased the rate of reaction between the vinyl chloride monomer and ozone.

EXAMPLE 2

The rate of reaction of vinylidene chloride in a gas mixture containing nitrogen, oxygen, ozone and vinylidene chloride was determined using the apparatus of Example 1. A gas mixture containing 1000 ppm vinylidene chloride by volume and 1 percent ozone by volume was prepared by introducing vinylidene chloride into the ozonized air stream from the Welsbach ozone generator. The procedure used in Example 1 was used to determine reaction of vinylidene chloride.

| | |
|---|---|
| Air Flow to Ozonzer liters/minute | 5 |
| Mole Ozone/mole vinylidene chloride | 10 |
| Temperature | 24°C. |

| Time Sample Held In Syringe (minutes) | Vinylidene Chloride Concentration (parts per million by volume) |
|---|---|
| Control 0 | 1000 |
| 0.4 | 294 |
| 1.0 | 247 |
| 4.0 | 179 |
| 8 | 123 |
| 16 | 86 |

The example illustrates that vinylidene chloride reacts slower than vinyl chloride. The rate of reaction is substantially increased at 100° to 150°C.

What is claimed is:

1. A method for controlling the amount of ethylenically unsaturated chlorinated hydrocarbons in gas streams which comprises forming a gas mixture containing the ethylenically unsaturated chlorinated hydrocarbon and ozone in a reaction zone and maintaining the gas mixture in the reaction zone for a sufficient length of time for the ozone to react with the ethylenically unsaturated chlorinated hydrocarbon to reduce the amount of ethylenically unsaturated chlorinated hydrocarbon in the gas stream.

2. The process of claim 1 wherein the reaction zone is a conduit through which the gas mixture containing the ethylenically unsaturated chlorinated hydrocarbon and ozone is flowing.

3. The process of claim 1 wherein the gas mixture is at a temperature between about 0° and 250°C.

4. The process of claim 1 wherein the gas mixture is at a temperature between about 10° and 200°C.

5. The process of claim 1 wherein the mole ratio of ozone to ethylenically unsaturated double bond in the gas mixture is from about 0.5 to about 2.0.

6. The process of claim 3 wherein the mole ratio of ozone to ethylenically unsaturated double bond in the gas mixture is from about 0.5 to about 2.0.

7. The process of claim 1 wherein the ethylenically unsaturated chlorinated hydrocarbon is vinyl chloride.

8. The process of claim 1 wherein the ethylenically unsaturated chlorinated hydrocarbon is vinylidene chloride.

9. The process of claim 1 wherein the gas stream which has been reacted with ozone is contacted with an aqueous liquid to remove water soluble reaction products from the gas stream.

10. The process of claim 9 wherein the aqueous liquid is a mixture or solution containing a composition selected from the group consisting of alkali metal hydroxides, alkali metal carbonates, alkaline earth metal hydroxides, alkaline earth metal carbonates and mixtures thereof.

11. The process of claim 9 wherein the aqueous liquid is water.

12. The process of claim 9 wherein the aqueous liquid is a solution of hydrogen chloride.

* * * * *